United States Patent
Bilodeau et al.

(10) Patent No.: US 10,288,802 B2
(45) Date of Patent: May 14, 2019

(54) OPTICAL FIBER HEAT DISSIPATION PACKAGE

(71) Applicant: Teraxion, Quebec (CA)

(72) Inventors: Ghislain Bilodeau, Quebec (CA); Dominic Faucher, Quebec (CA); Mathieu Faucher, Quebec (CA); Francois Seguin, Baie-d'Urfe (CA)

(73) Assignee: Teraxion, Quebec (CA)

( * ) Notice: Subject to any disclaimer, the term of this patent is extended or adjusted under 35 U.S.C. 154(b) by 0 days.

(21) Appl. No.: 15/584,612

(22) Filed: May 2, 2017

(65) Prior Publication Data

US 2018/0321440 A1  Nov. 8, 2018

(51) Int. Cl.
| | |
|---|---|
| G02B 6/02 | (2006.01) |
| G02B 6/028 | (2006.01) |
| G02B 7/00 | (2006.01) |
| G02B 6/036 | (2006.01) |
| G02B 6/42 | (2006.01) |
| G02B 6/44 | (2006.01) |

(52) U.S. Cl.
CPC ............ *G02B 6/0218* (2013.01); *G02B 6/02* (2013.01); *G02B 6/036* (2013.01); *G02B 6/4267* (2013.01); *G02B 6/44* (2013.01); *G02B 7/008* (2013.01); *G02B 6/02209* (2013.01)

(58) Field of Classification Search
None
See application file for complete search history.

(56) References Cited

U.S. PATENT DOCUMENTS

| | | | | |
|---|---|---|---|---|
| 4,714,316 | A * | 12/1987 | Moore | G02B 6/2835 385/137 |
| 6,438,300 | B1* | 8/2002 | Bernstein | G02B 6/4471 385/100 |
| 7,373,070 | B2* | 5/2008 | Wetter | G02B 6/0218 385/134 |
| 9,667,025 | B2* | 5/2017 | Johnson | H01S 3/0675 |
| 2002/0191922 | A1* | 12/2002 | Goto | G02B 6/3636 385/94 |
| 2003/0007751 | A1* | 1/2003 | Shinozaki | G02B 6/0218 385/92 |
| 2009/0060444 | A1* | 3/2009 | Muendel | G02B 6/3636 385/137 |
| 2011/0110625 | A1* | 5/2011 | Chatigny | G02B 6/3636 385/29 |

(Continued)

*Primary Examiner* — Michelle R Connelly
(74) *Attorney, Agent, or Firm* — Hovey Williams LLP

(57) ABSTRACT

A heat-dissipation package for use with an optical fiber includes a base, a cover, and a hollow sleeve. The base includes an upper surface, a lower surface, and a groove embedded in the upper surface, the groove having a generally U-shaped cross-sectional shape. The cover is positioned on the upper surface of the base. The sleeve includes a cylindrical inner surface and an outer surface with a first portion which has a generally U-shaped cross section and a second portion which has a generally planar cross section such that edges of the planar cross section contact an open end of the U-shaped cross section. The first portion of the outer surface of the sleeve is positioned in the groove and the second portion of the outer surface of the sleeve is in contact with the cover. The sleeve is configured to encapsulate a heat-generating section of the optical fiber.

37 Claims, 11 Drawing Sheets

(56) References Cited

U.S. PATENT DOCUMENTS

2013/0315548 A1* 11/2013 Salokatve ............ G02B 6/0218
  385/134
2014/0270637 A1* 9/2014 Desbiens ............. G02B 6/0288
  385/29

* cited by examiner

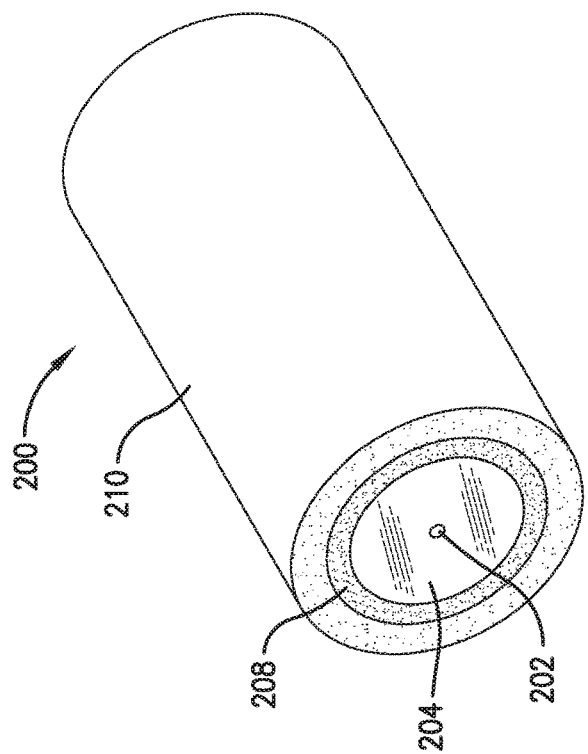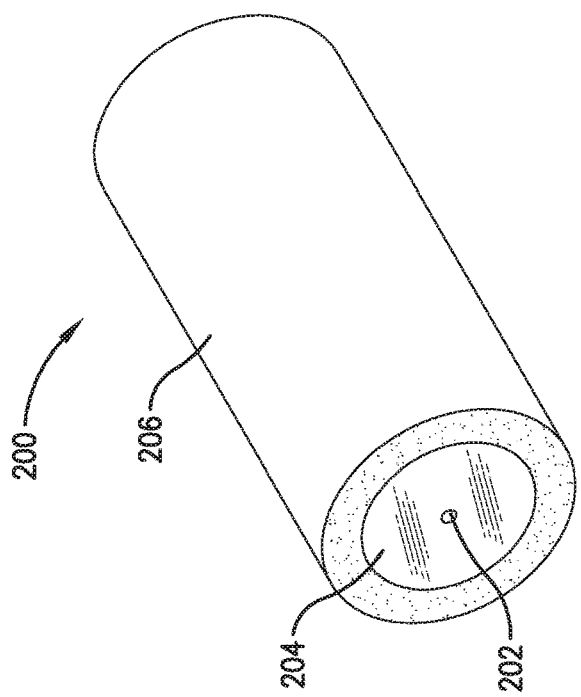

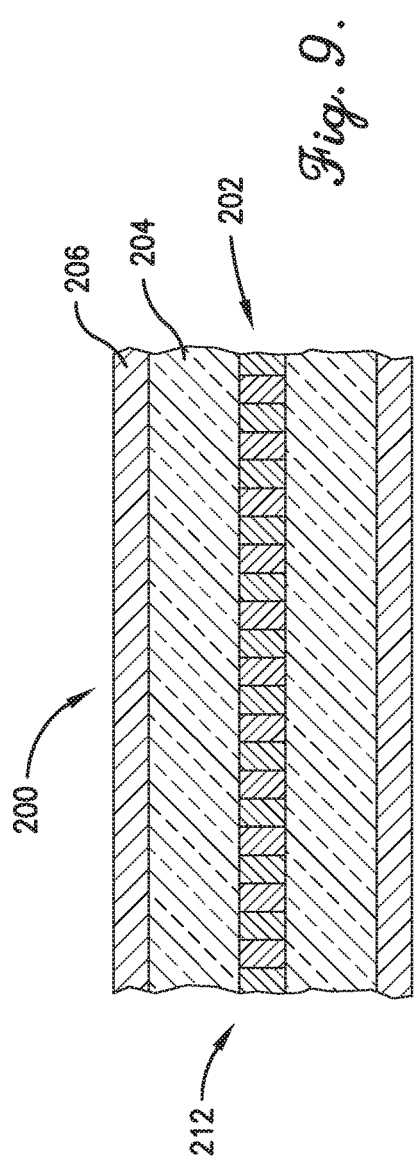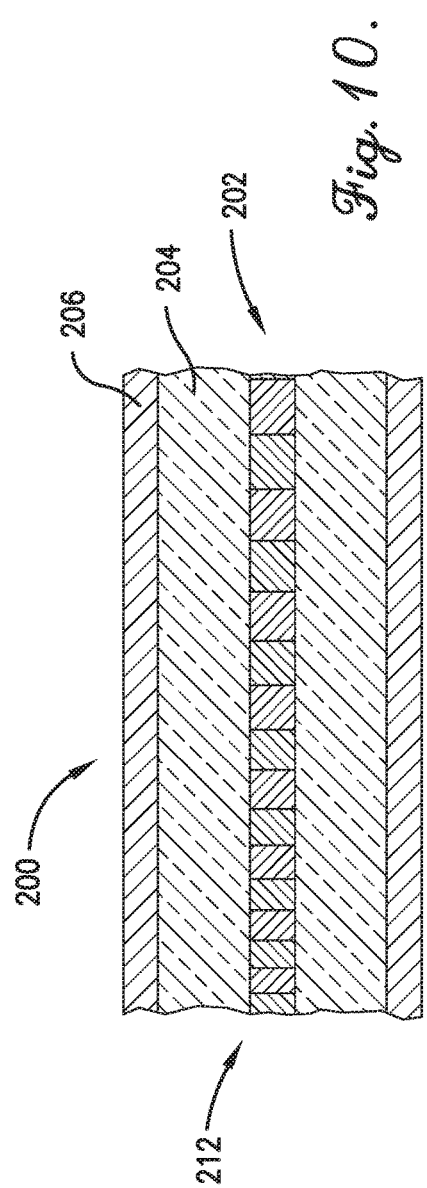

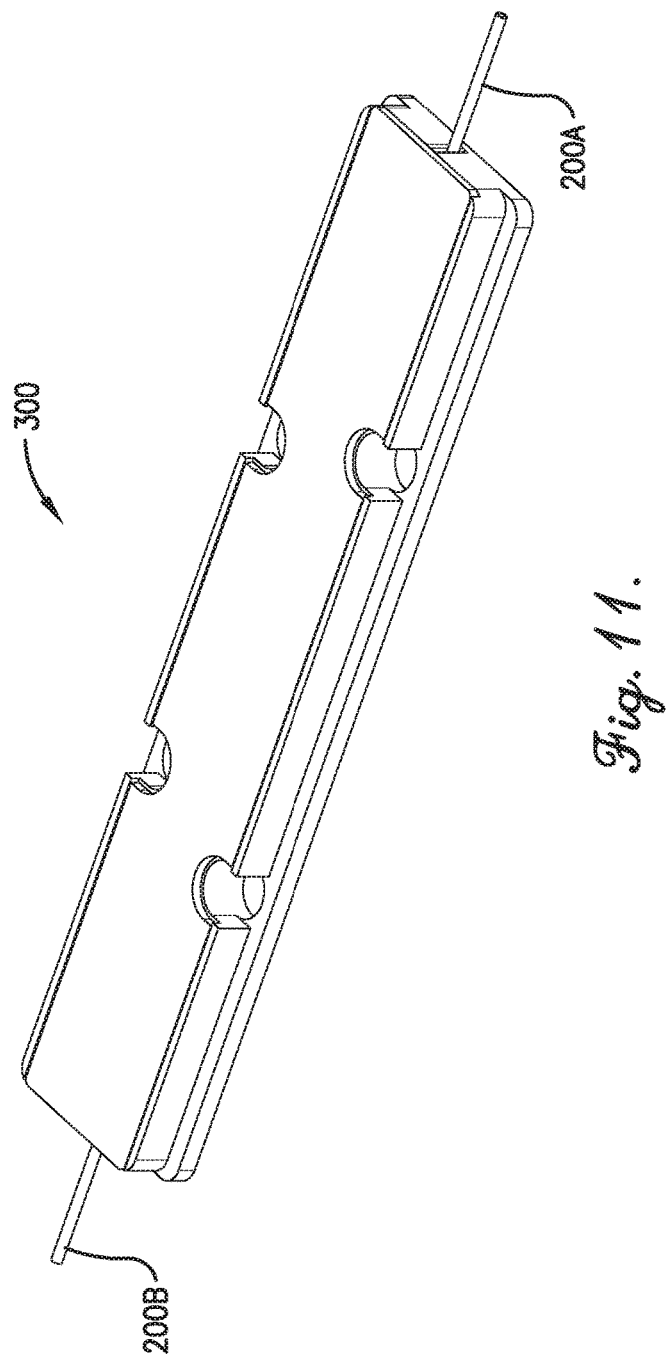

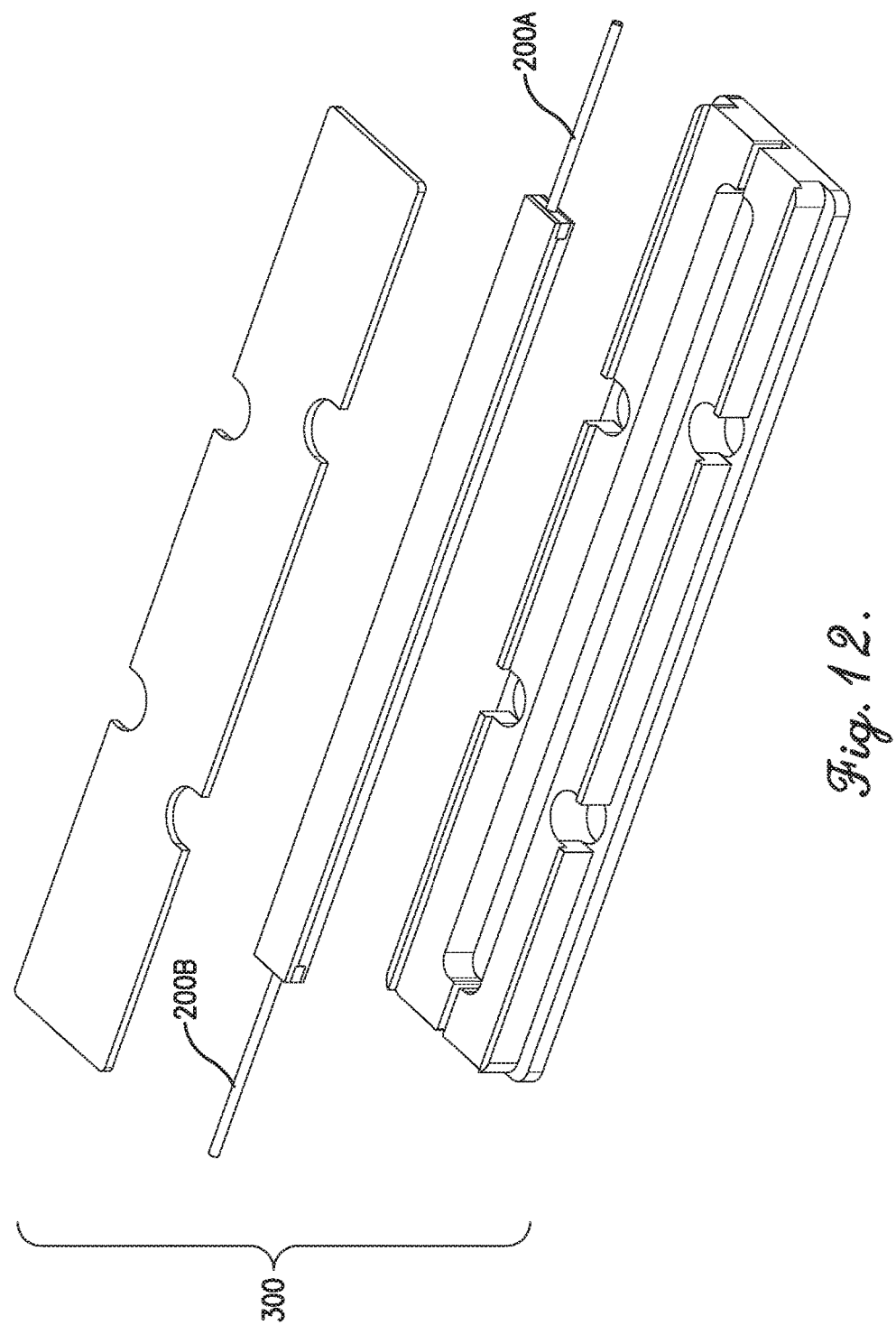

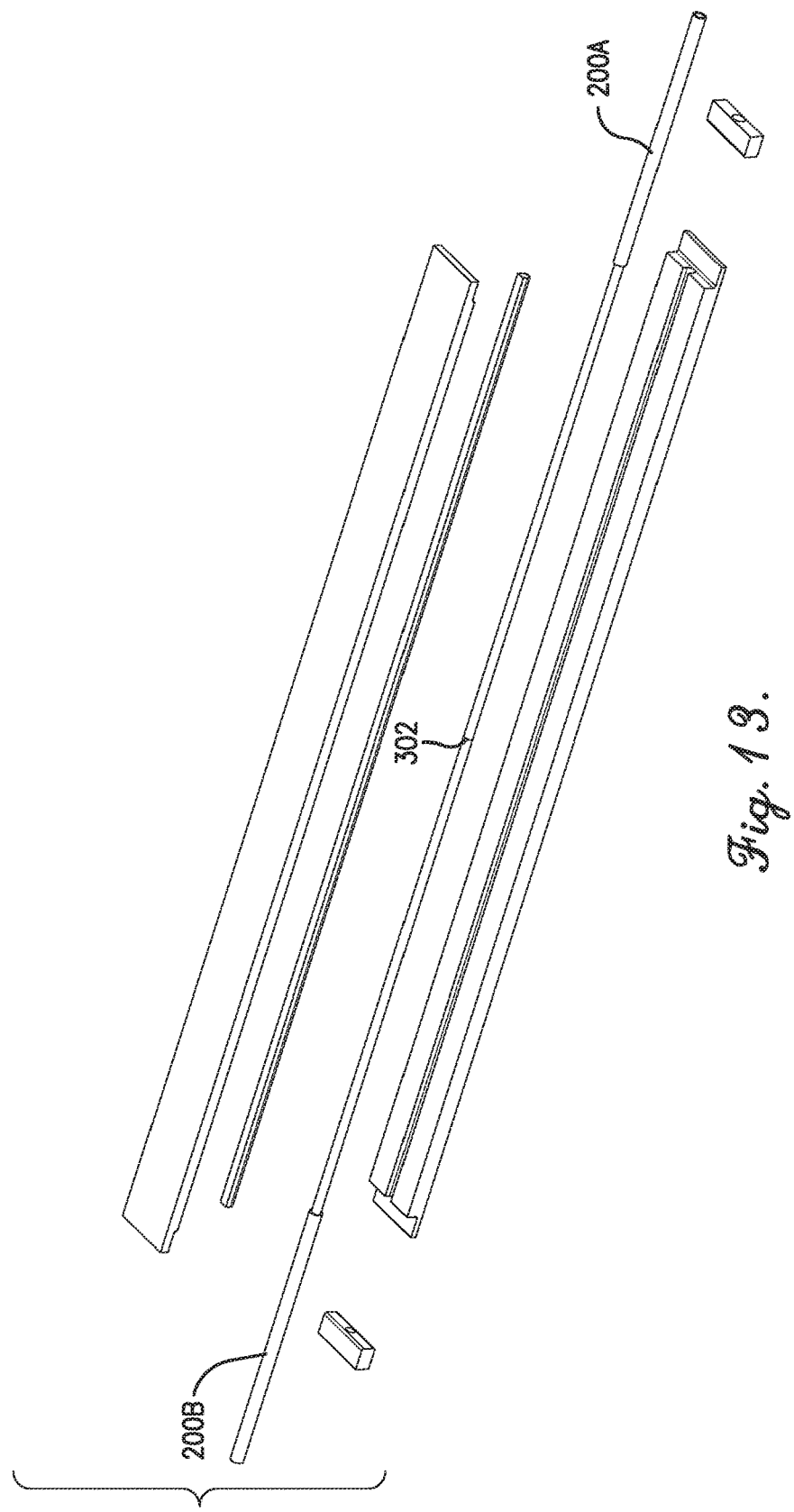

OPTICAL FIBER HEAT DISSIPATION PACKAGE

BACKGROUND OF THE INVENTION

Field of the Invention

Embodiments of the current invention relate to packaging for use with optical fibers.

Description of the Related Art

Optical fiber laser systems 100, such as the exemplary system of prior art FIG. 1, may include a lasing pump source 102, a high reflector optical fiber 104, a gain optical fiber 106, and an output coupler optical fiber 108. The lasing pump source 102 may be provided by a plurality of laser diodes 110 and a pump combiner 112. Each laser diode 110 may generate laser light. The pump combiner 112 may optically combine the laser light from the laser diodes 110. The high reflector optical fiber 104 may include a fiber Bragg grating (FBG) which acts as a mirror. The gain optical fiber 106 may be spliced to the high reflector optical fiber 104 and may be doped with elements such as ytterbium or erbium to act as a gain medium. The output coupler optical fiber 108 may be spliced to the gain optical fiber 106 and may include an FBG which acts as a partial mirror. The light output from the pump combiner 112 may be coupled into the high reflector optical fiber 104, which along with the gain optical fiber 106 and the output coupler optical fiber 108 form an optical resonator. The laser beam may be provided by the output coupler optical fiber 108 or a delivery optical fiber spliced thereto.

The FBG of the high reflector optical fiber 104 and the output coupler optical fiber 108 typically absorbs a small fraction of the incoming light. Contaminants that remain at the glass surface of the optical fiber after the fabrication of an FBG can also absorb some of the light propagating inside the fiber. This absorption by the FBG and surface contaminants may produce heat and an ensuing temperature increase that can be sizable when the incoming optical power reaches kilowatt levels. The FBG and surrounding materials may not be able to withstand this temperature increase without sacrificing performance metrics such as spectral response.

SUMMARY OF THE INVENTION

Embodiments of the current invention solve the above-mentioned problems and provide a distinct advance in the art of optical fiber packaging. Specifically, embodiments of the current invention provide a heat-dissipation package that effectively removes heat from the cladding of an optical fiber implemented with a fiber Bragg grating. The heat-dissipation package may broadly comprise a base, a cover, and a hollow sleeve. The base includes an upper surface, a lower surface, and a groove embedded in the upper surface, the groove having a generally U-shaped cross-sectional shape. The cover is positioned on the upper surface of the base. The sleeve includes a cylindrical inner surface and an outer surface with a first portion which has a generally U-shaped cross section and a second portion which has a generally planar cross section such that edges of the planar cross section contact an open end of the U-shaped cross section. The first portion of the outer surface of the sleeve is positioned in the groove and the second portion of the outer surface of the sleeve is in contact with the cover. The sleeve is configured to encapsulate a heat-generating section of the optical fiber.

Another embodiment of the current invention may provide a heat-dissipation package for use with an optical fiber that broadly comprises a housing and a submount. The housing includes a central cavity and opposing ends, each end having a channel configured to receive a portion of the optical fiber. The submount is positioned in the central cavity and includes a base, a cover, two fiber support blocks, and a hollow sleeve. The base includes an upper surface, a lower surface, two opposing end surfaces, and a groove embedded in the upper surface. The groove has a generally U-shaped cross-sectional shape, with each end surface including a pedestal extending longitudinally therefrom. The cover includes an upper surface, a lower surface and two opposing end surfaces, with each end surface including an overhang extending longitudinally therefrom. One fiber support block is positioned in each of the spaces created between one overhang and one corresponding pedestal. Each fiber support block includes a through hole and is configured to receive a portion of the optical fiber in the through hole. The sleeve includes a cylindrical inner surface and an outer surface with a first portion which has a generally U-shaped cross section and a second portion which has a generally planar cross section such that edges of the planar cross section contact an open end of the U-shaped cross section. The first portion of the outer surface of the sleeve is positioned in the groove and the second portion of the outer surface of the sleeve is in contact with the cover. The sleeve is configured to encapsulate the heat-generating section of the optical fiber.

Yet another embodiment of the current invention may provide an optical fiber laser system component broadly comprising an optical fiber, a base, a cover, and a hollow sleeve. The optical fiber has a fiber Bragg grating section and includes a core which is surrounded by at least one cladding which is surrounded by at least one coating layer. The fiber Bragg grating section includes the core surrounded by the cladding. The base includes an upper surface, a lower surface, and a groove embedded in the upper surface, the groove having a generally U-shaped cross-sectional shape. The cover is positioned on the upper surface of the base. The sleeve includes a cylindrical inner surface and an outer surface with a first portion which has a generally U-shaped cross section and a second portion which has a generally planar cross section such that edges of the planar cross section contact an open end of the U-shaped cross section. The first portion of the outer surface of the sleeve is positioned in the groove and the second portion of the outer surface of the sleeve is in contact with the cover. The sleeve is configured to encapsulate the fiber Bragg grating section of the optical fiber.

Still another embodiment of the current invention may provide an optical fiber assembly broadly comprising first and second optical fibers, a base, a cover, and a hollow sleeve. The optical fibers are spliced together with a fiber splice. Each optical fiber includes a core which is surrounded by at least one cladding which is surrounded by at least one coating layer and a stripped section which abuts the fiber splice. The stripped section includes the core surrounded by the at least one cladding. The base includes an upper surface, a lower surface, and a groove embedded in the upper surface, the groove having a generally U-shaped cross-sectional shape. The cover is positioned on the upper surface of the base. The sleeve includes a cylindrical inner surface and an outer surface with a first portion which has a generally U-shaped cross section and a second portion which has a generally planar cross section such that edges of the planar cross section contact an open end of the U-shaped cross section. The first portion of the outer surface of the sleeve is positioned in the groove and the second portion of the outer surface of the sleeve is in contact with the cover. The sleeve is configured to encapsulate the stripped sections of the first and second optical fibers.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 7 is a perspective view of an end of a first embodiment of the optical fiber including a mechanical protection coating, a cladding, and a core;

FIG. 8 is a perspective view of an end of a second embodiment of the optical fiber including a secondary coating, a primary low-index coating, a cladding, and a core;

FIG. 9 is cross-sectional view of the optical fiber, cut along an axial plane, depicting the core with a first embodiment of a fiber Bragg grating;

FIG. 10 is cross-sectional view of the optical fiber, cut along an axial plane, depicting the core with a second embodiment of a fiber Bragg grating;

FIG. 11 is a perspective view of an optical fiber assembly, constructed in accordance with additional embodiments of the current invention, the assembly including a fiber splice;

FIG. 12 is an exploded view of the optical fiber assembly of FIG. 11 including a housing and a submount; and FIG. 13 is an exploded view of the submount of the assembly depicting the fiber splice.

Figure 1:
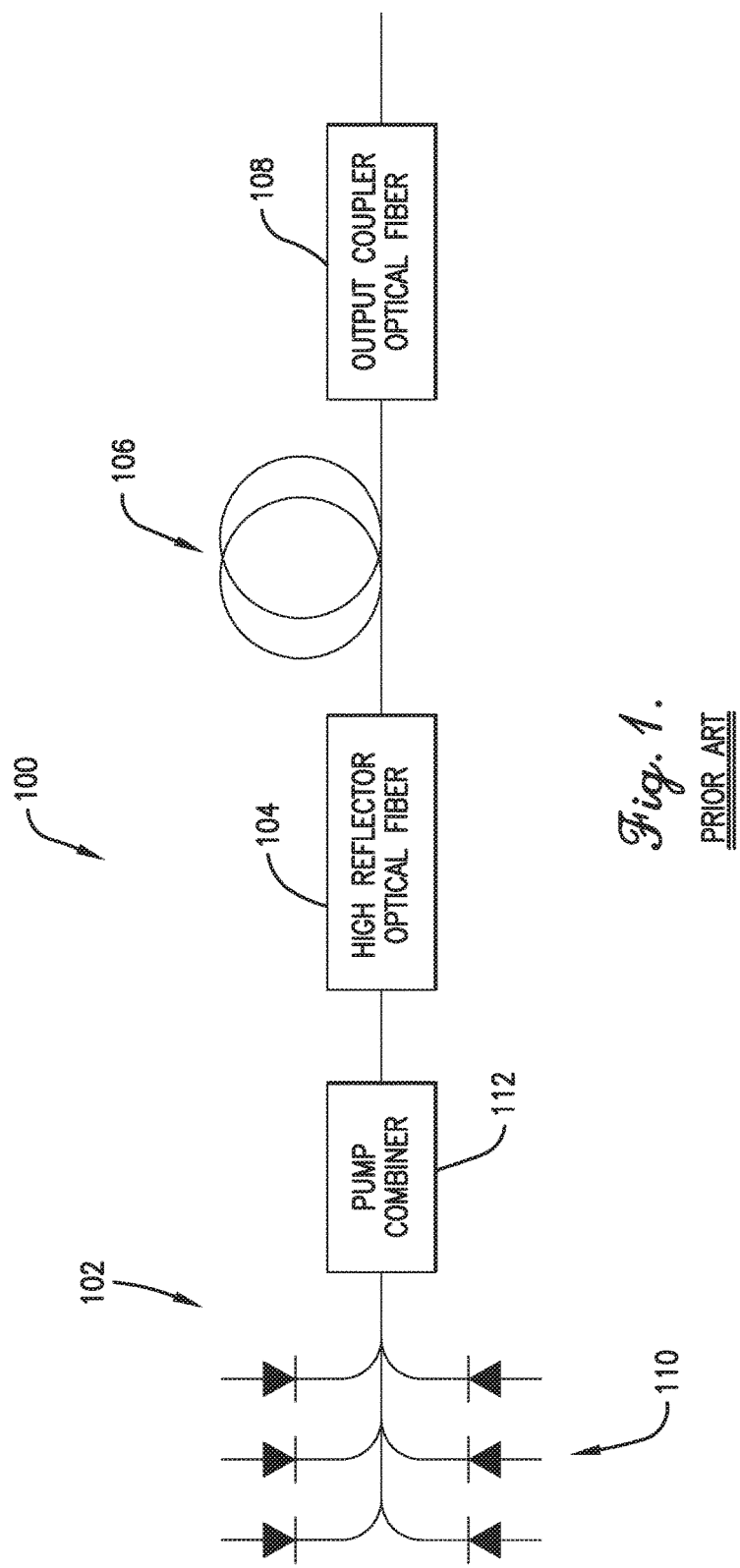
FIG. 1 is a schematic block diagram of a prior art optical fiber laser system.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

A heat-dissipation package 10, constructed in accordance with various embodiments of the current invention, for use with optical fibers 200 in an optical fiber laser system 100 is shown in FIGS. 2-6. A first heat-dissipation package 10 may retain the high reflector optical fiber 104 and a second heat dissipation package 10 may retain the output coupler optical fiber 108 in the optical fiber laser system 100 of FIG. 1.

The optical fiber 200 may generally have an exemplary structure that includes a central core 202, a coaxial cladding 204, and a coaxial coating 206, as seen in FIG. 7. The core 202 and the cladding 204 may each be formed from a glass material with the index of refraction of the cladding 204 being less than the index of refraction of the core 202. The coating 206 may be formed from a polymer material and generally provides mechanical protection and minimizes stress for the cladding 204.

In another embodiment, the optical fiber 200 may include a central core 202, a coaxial cladding 204, a coaxial first coating 208, and a coaxial second coating 210, as seen in FIG. 8. As above, the core 202 and the cladding 204 may each be formed from a glass material with the index of refraction of the cladding 204 being less than the index of refraction of the core 202. The first coating 208 may be from a polymer material, such as a soft, low-index fluoroacrylate polymer, that has an index of refraction less than the index of refraction of the cladding 204. Typically, the difference in index of refraction between the first coating 208 and the cladding 204 is much greater than the difference in index of refraction between the cladding 204 and the core 202 in order to minimize penetration of light from the cladding 204 to the first coating 208 and to be able to inject light into the cladding 204 instead of just the core 202. The second coating 210 may be formed from a polymer material and generally provides mechanical protection. Such a fiber is typically used in a high-power laser system 100 where the cladding 204 is used to guide the light output from the pump combiner 112. As known in the art, a fiber of the type illustrated in FIG. 8 may have more than one cladding made of glass (not illustrated).

When the optical fiber 200 is utilized as the high reflector optical fiber 104 or the output coupler optical fiber 108, the core 202 of the optical fiber 200 may include a fiber Bragg grating (FBG) 212. An exemplary FBG 212 may include a periodical modulation of the index of refraction 214 extending along the longitudinal axis of the optical fiber. In a first embodiment, seen in FIG. 9, the modulation of the index of refraction has a uniform period. In a second embodiment, seen in FIG. 10, the period of the modulation of the index of refraction varies axially, which forms a chirped FBG 212. The FBG 212 within the optical fiber 200 creates an optical reflector for laser light. The wavelength of the light reflected by the FBG 212 may vary according to, at least, the period of the modulation of the index of refraction 214 and the average value of the index of refraction. The strength of the reflection depends on a length of the grating and an amplitude of the index modulation.

Figure 3:
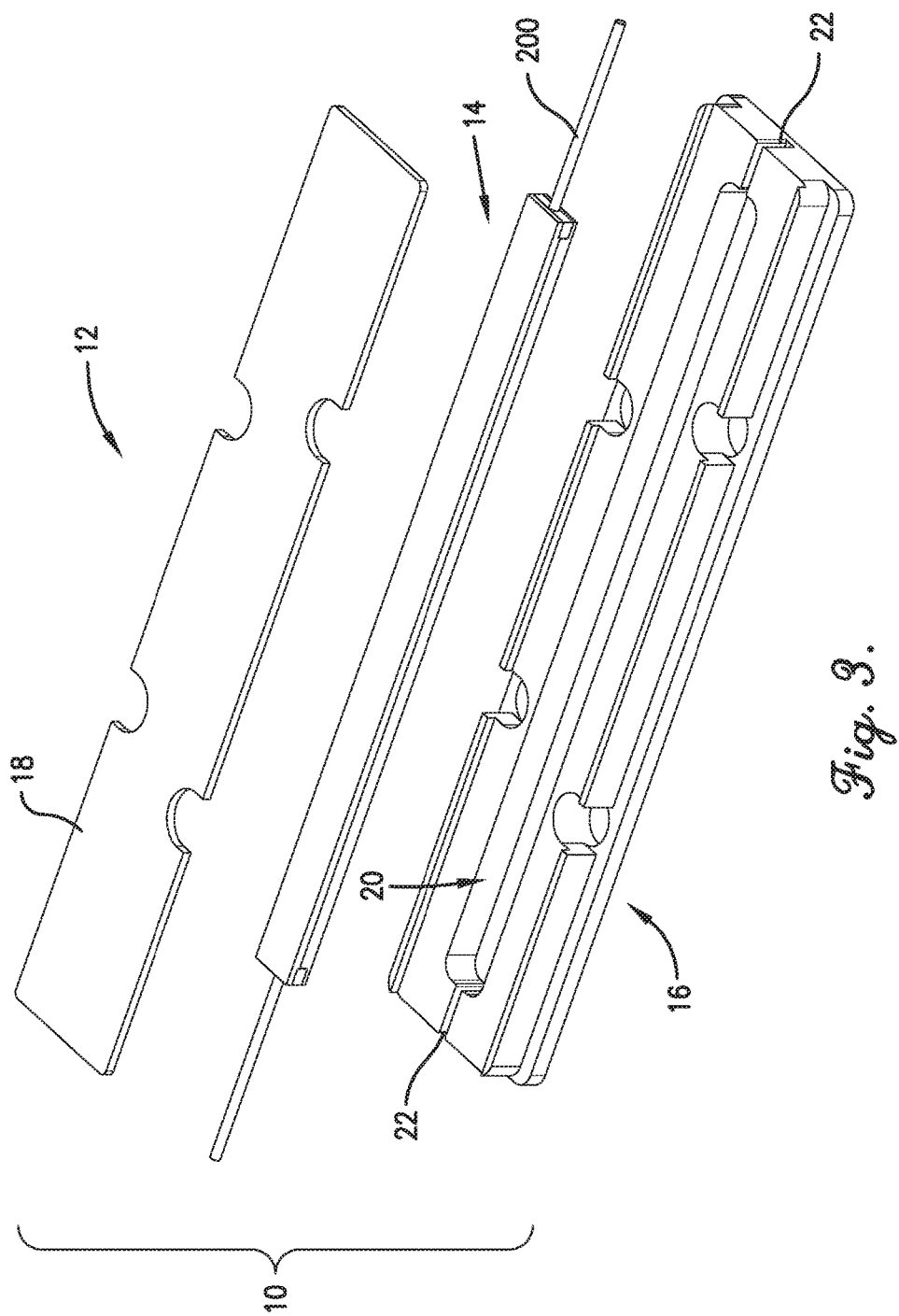
FIG. 3 is an exploded view of the heat-dissipation package including a housing and a submount.

The heat-dissipation package 10 may broadly comprise a housing 12 and a submount 14, as best seen in FIG. 3. The housing 12 may include a body 16 and a lid 18. The body 16 may be of generally solid elongated rectangular box shape with an upper surface, a lower surface, two side surfaces, and two end surfaces. The upper surface may be recessed from the tops of the side surfaces. The body 16 may include an elongated cavity 20 with two end channels 22. The cavity 20 may be positioned in the center of the body 16 and aligned with the longitudinal axis thereof. The end channels 22 are longitudinal axis aligned as well and extend from the cavity 20 to each end surface. The body 16 may also include a plurality of through holes from the top surface to the bottom surface configured to receive screws, or the like, to mount the package 10 to an external surface. In some embodiments, the body 16 may further include two flanges, each extending from one side surface adjacent to the bottom surface.

The lid 18 may be of generally elongated rectangular shape and relatively thin compared to its length and width. The lid 18 may include a top surface, a bottom surface, two side edges, and two end edges. The lid 18 may also include through holes from the top surface to the bottom surface which align with the through holes of the body 16. The body 16 may be formed from material with high thermal conductivity and mechanical strength.

Figure 4:
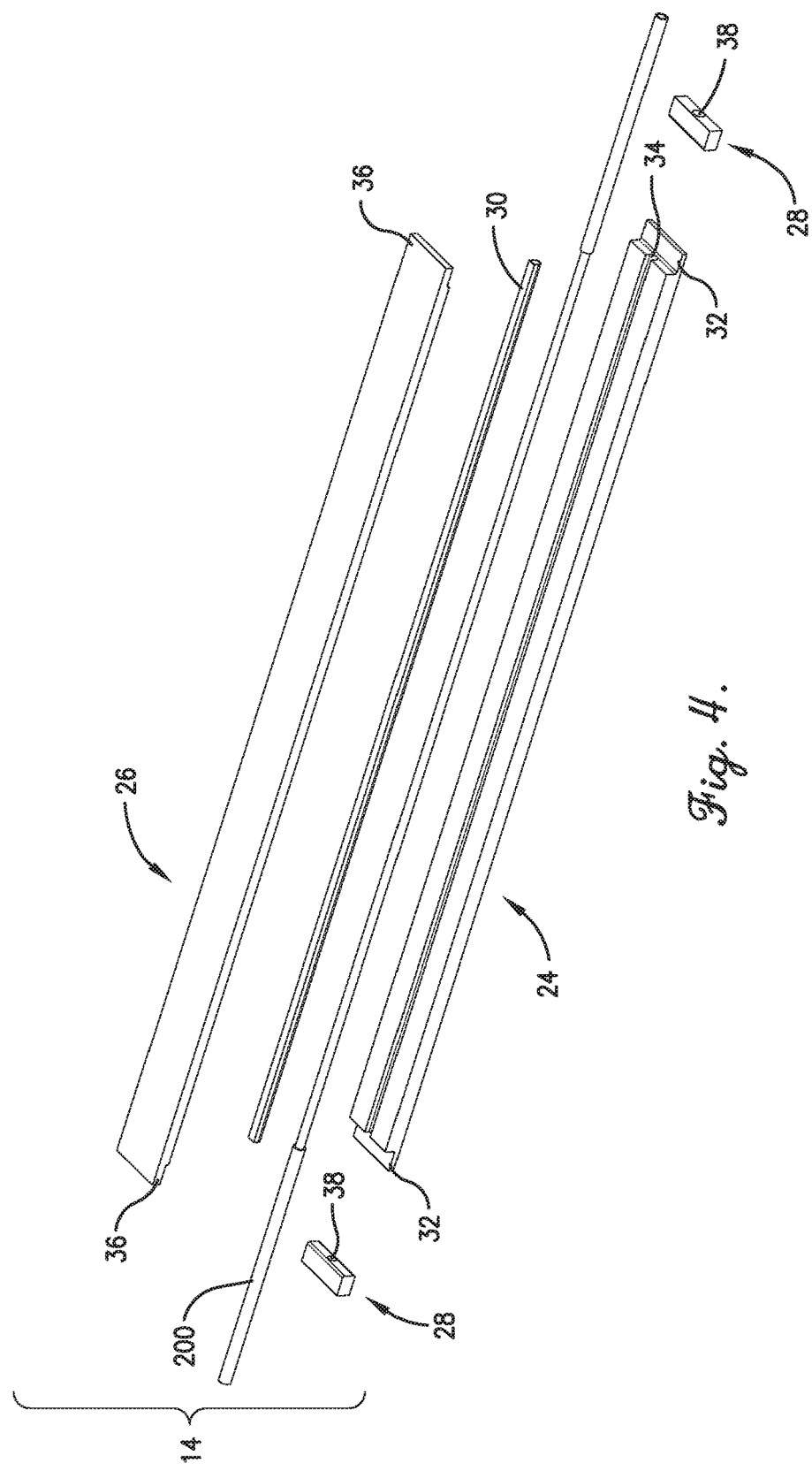
FIG. 4 is an exploded view of the submount including a base, a cover, two support blocks, and a sleeve.
Figure 5:
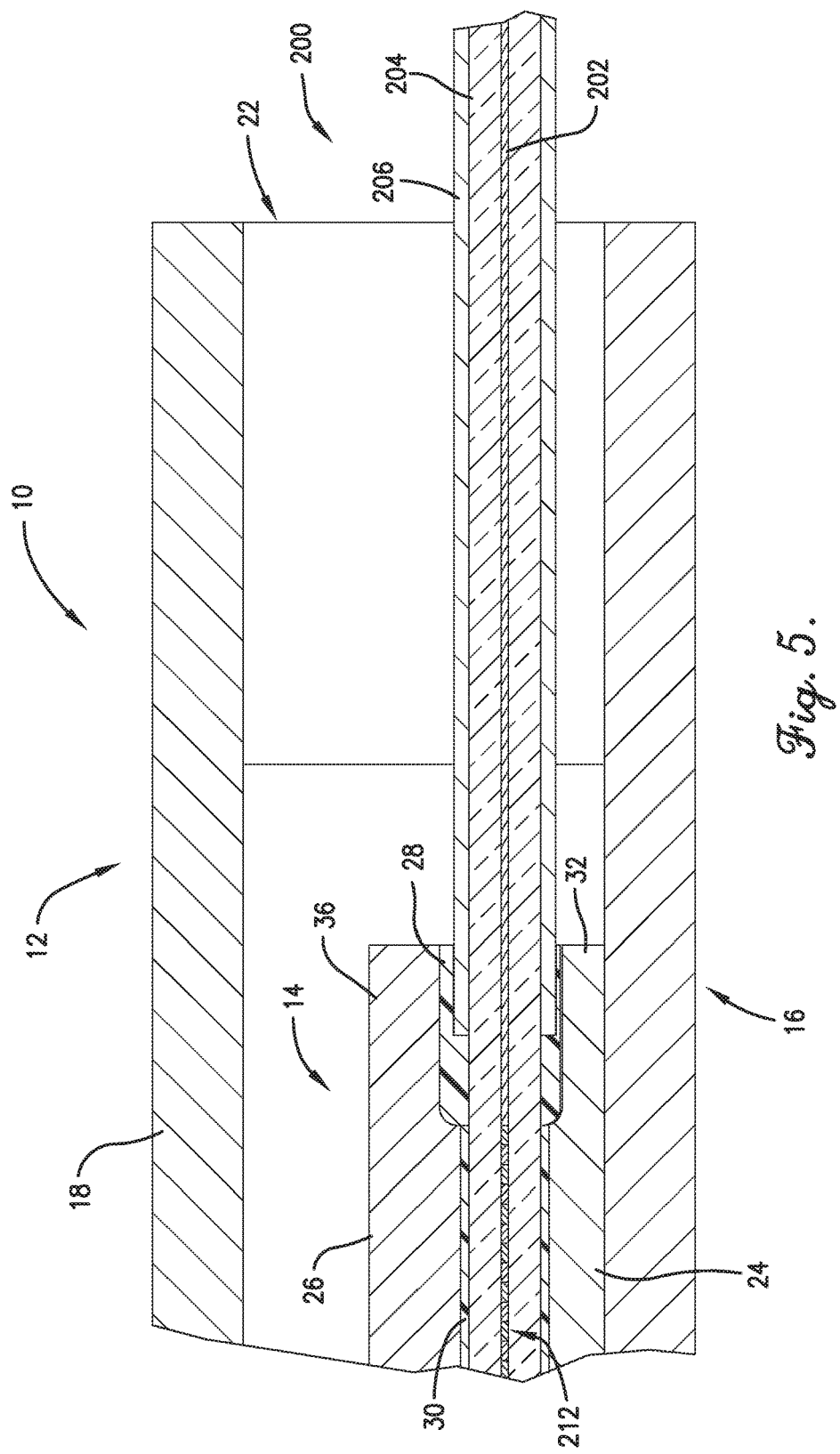
FIG. 5 is a cross-sectional view of one end of the heat-dissipation package, cut along line 5-5 of FIG. 2, depicting the interface of the optical fiber and the package.

The submount 14 may comprise a base 24, a cover 26, first and second fiber support blocks 28, and a sleeve 30, as best seen in FIG. 4. The base 24 may also be of generally solid elongated rectangular box shape with an upper surface, a lower surface, two side surfaces, and two end surfaces. The base 24 may further include first and second pedestals 32, each of which extends outward longitudinally from one of the end surfaces adjacent to the lower surface, as seen in FIGS. 4 and 5. In some embodiments, a corner of the joint between each pedestal 32 and its corresponding end surface may be rounded. In addition, the base 24 may include a groove 34 in the upper surface extending along a central axis line. The groove 34 may have a U-shaped cross section. In alternative embodiments, the groove 34 may have other cross-sectional shapes, such as semi-circular, semi-oval, semi-elliptical, triangular, square, rectangular, etc.

The cover 26 may be of generally solid elongated rectangular box shape with an upper surface, a lower surface, two side surfaces, and two end surfaces. In certain embodiments, the cover 26 may include a groove typically with a complementary cross-sectional shape to that of the groove 34 in the base 24. The cover 26 may further include first and second overhangs 36, each of which extends outward longitudinally from one of the end surfaces adjacent to the upper surface, as seen in FIGS. 4 and 5. In some embodiments, a corner of the joint between each overhang 36 and its corresponding end surface may be rounded. The base 24 and the cover 26 may each be formed from material with a high thermal conductivity.

Each fiber support block 28 may be of generally solid elongated rectangular box shape with an upper surface, a lower surface, two side surfaces, and two end surfaces, as seen in FIGS. 4 and 5. In some embodiments, the corners between one end surface and the upper and lower surfaces may be rounded. Each fiber support block 28 may further include a through hole 38 extending, transverse from the longitudinal axis of the block 28, from one end surface to the opposing end surface. In addition, the through hole 38 may include a first section with a first diameter and a second section with a second diameter, wherein the first diameter is less than the second diameter. Each fiber support block 28 may be formed from a polymer material with an index of refraction that is less than the index of refraction of the cladding 204 of the optical fiber 200.

Figure 6:
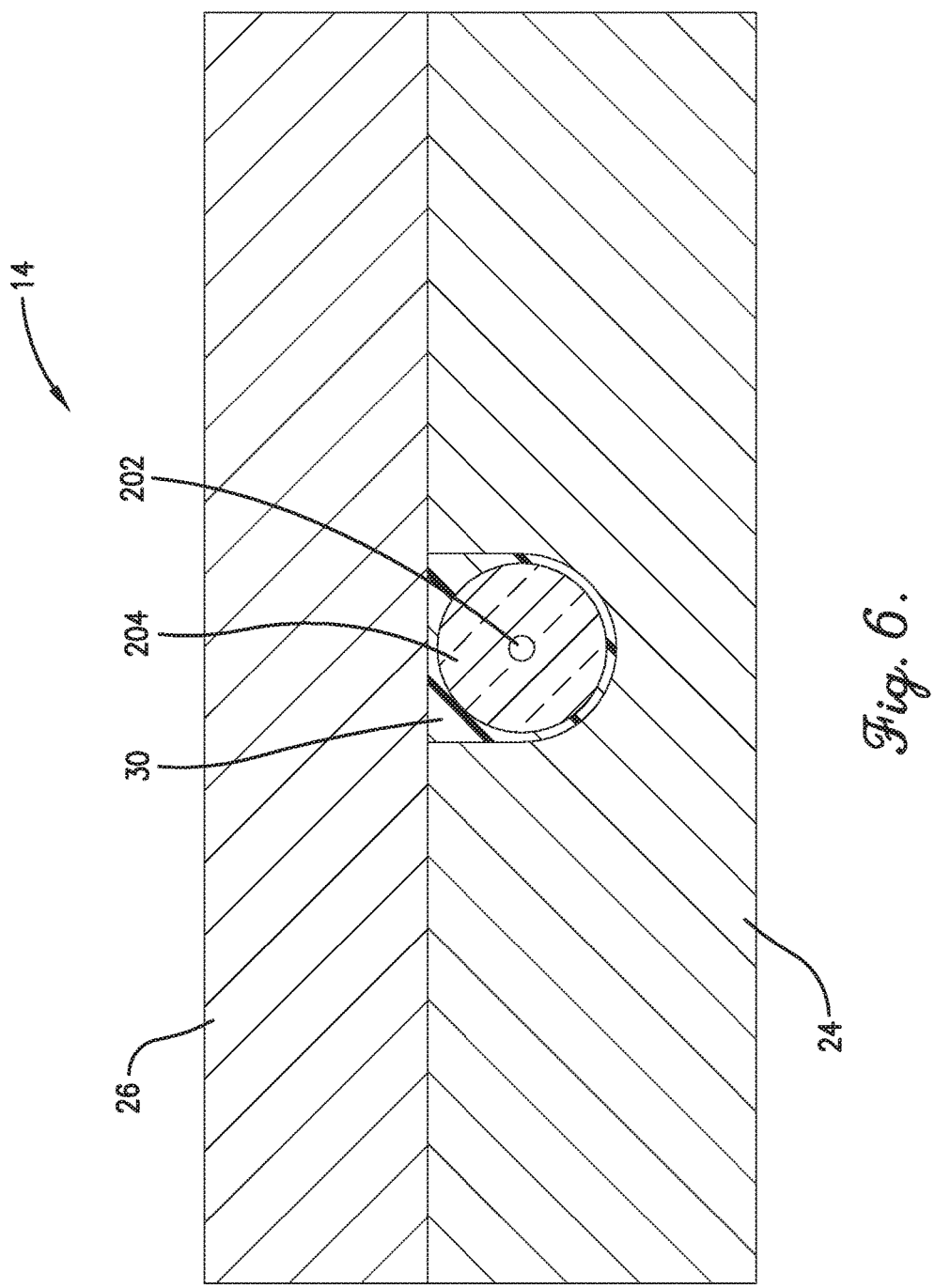
FIG. 6 is a cross-sectional view of the submount cut along a vertical plane transverse to the longitudinal axis depicting the base, the cover, the sleeve, and the optical fiber encapsulated by the sleeve.

The sleeve 30 may be hollow with a cylindrical inner surface that has a circular cross-sectional shape. The sleeve 30 may have an outer surface with a U-shaped cross section, such that a first portion of the outer surface forms a U shape and a second portion of the outer surface is planar and couples with the open end of the first portion, as best seen in FIG. 6. The sleeve 30 may be utilized to encapsulate the cladding 204 of the optical fiber 200 in region where the optical fiber 200 includes the FBG 212. Therefore, the sleeve 30 may have a longitudinal axial length that is approximately equal to the length of the FBG 212. In some embodiments, the ends of the sleeve 30 may extend beyond the ends of the FBG 212 by a predetermined length. The sleeve 30 may be formed from a polymer material with an index of refraction that is less than the index of refraction of the cladding 204 of the optical fiber 200.

The submount 14 may have a construction as follows. The sleeve 30 may be configured to receive, retain, and/or encapsulate a portion of the longitudinal axial length of the cladding 204 and the core 202 of an optical fiber 200 such that an outer surface of the cladding 204 is in physical contact with the inner surface of the sleeve 30. (Coatings on the optical fiber 200 are removed before the optical fiber 200 is implemented with the heat-dissipation package 10.) The sleeve 30 may be positioned within the groove 34 of the base 24 such that the U-shaped portion of the outer surface of the sleeve 30 is in physical contact with the groove 34. The cover 26 may be positioned on the base 24 such that the lower surface of the cover 26 is in physical contact with the upper surface of the base 24 and the planar portion of the outer surface of the sleeve 30. The cover 26 may be attached to the base 24 with adhesives, fasteners, or the like. Once the cover 26 is on the base 24, the ends of the sleeve 30 may align with the end surfaces of the cover 26 and the base 24.

The assembly of the base 24 and the cover 26 may form two spaces, one space at each end of the submount 14 between one overhang 36 and one corresponding pedestal 32. As seen in FIGS. 3 and 5, one fiber support block 28 may be positioned within each space, such that the upper surface of the fiber support block 28 physically contacts the overhang 36, the lower surface of the fiber support block 28 physically contacts the pedestal 32, and one end surface of the fiber support block 28 physically contacts at least a portion of the end surfaces of the base 24 and the cover 26. Furthermore, each end of the sleeve 30 may physically contact a portion of one end surface of one fiber support block 28. In addition, the through hole 38 of each fiber support block 28 may be configured to receive and/or retain a portion of the optical fiber 200 such that the cladding 204 and the core 202 of the optical fiber 200 are positioned in the first section of the through hole 38, and the coating 206, the cladding 204, and the core 202 of the optical fiber 200 are positioned in the second section of the through hole 38, as illustrated in FIG. 5. When the optical fiber has two coatings as illustrated in FIG. 8, the second section of the through hole 38 may be configured to receive the second coating 210, the first coating 208, the cladding 204 and the core 202 (not illustrated).

The heat-dissipation package 10 may have a construction as follows. The submount 14 may be positioned in the cavity 20 such that the lower surface of the base 24 contacts the body 16 of the housing 12. In addition, the optical fiber 200 is retained by the submount 14 and extends through the end channels 22. The optical fiber 200 may be attached to the housing 12 with an adhesive in each end channel 22, or within the cavity 20 adjacent to each end channel 22. In various embodiments, the end channels 22 may be filled with a soft material (not shown in the figures) such as silicone to minimize the mechanical forces acting on the optical fiber 200. The lid 18 may be positioned in the recess on the top surface of the body 16 and may be attached thereto with adhesives and/or fasteners.

At least one of the functions of the heat-dissipation package 10 is transfer or remove heat from the FBG 212 of the optical fiber 200 when the optical fiber 200 is used as the high reflector optical fiber 104 or the output coupler optical fiber 108 in an optical fiber laser system 100. In various implementations of the optical fiber laser system 100, light may be coupled into the core 202 and the cladding 204 of the optical fiber 200 from the pump combiner 112. In such a case, the package must also maintain the transmission of light in the cladding 204. Hence, the index of refraction of the hollow sleeve 30 must be smaller than the index of refraction of the fiber cladding 204. An exemplary low-index material may include a fluoroacrylate polymer. Furthermore, the thickness of the sleeve 30 should be relatively large in order to ensure that light guided in the cladding 204 does not reach the outer boundary of the sleeve 30. The hollow sleeve must also allow a good flow of heat in order to limit temperature increases at the fiber 200. To this end, the thermal resistance of the hollow sleeve 30 between the fiber cladding 204 and the base 24 may be less than approximately $1.5 \times 10^{-4}$ degree Kelvin meter$^2$ per Watt (° Km$^2$/W). Typically, the sleeve 30 is formed from material that has a low value of thermal conductivity. For example, the thermal conductivity of fluoroacrylate can be as small as approximately 0.2 Watts per meter degree Kelvin (W/m° K). Thus, the thickness (from the inner surface to the outer surface) of the sleeve 30 should be small to provide sufficient heat transfer away from the optical fiber 200. For optimum performance, the sleeve 30 made of a fluoroacrylate may have a thickness ranging from approximately 5 microns to approximately 30 microns, along its smallest dimension such as the rounded part of the U-shaped outer surface, perhaps best seen in FIG. 6.

The fiber support blocks 28 are also in direct contact with the optical fiber 200, as seen in FIG. 5, and may be formed from a material with the same properties as the sleeve 30. An exemplary material from which the fiber support blocks 28 are formed may include a fluoroacrylate polymer.

The base 24 and the cover 26 of the submount 14 may provide, among other features, transfer or removal of heat from the sleeve 30 and may be formed from materials with high thermal conductivity. However, the materials should also have a CTE similar to that of the fiber 200, be easy to manufacture, and have a reasonable cost, among other properties. Other considerations for the materials may include transmission of, or transparency to, ultraviolet (UV) wavelength radiation. In some instances, the sleeve 30 may be formed, or coated, on the cladding 204 of the optical fiber 200 by using a separate, external mold or by using other methods. In other instances, the sleeve 30 may be formed, or coated, on the cladding 204 while the cladding 204 is positioned in the base 24 with the cover 26 attached. In such circumstances, UV light transmitted through the cover 26 could be used to cure the material of the sleeve 30.

Exemplary materials that may be used to form the base 24 and the cover 26 include synthetic diamond, copper, aluminum, silicon, tungsten, synthetic sapphire, multispectral zinc sulphide, or the like. Synthetic diamond has an extremely high thermal conductivity and a CTE that is close to that of the optical fiber 200. However, its low availability and high cost make it impractical for a commercial product. Copper and aluminum have high thermal conductivities and are easily machined, but they also have a high CTE—making them incompatible with the optical fiber 200. Silicon and tungsten have relatively high thermal conductivities and CTEs which are closer to that of the optical fiber 200 than are copper and aluminum. Synthetic sapphire and multispectral zinc sulphide have CTEs which are closer to that of the optical fiber 200 than are copper and aluminum, but their thermal conductivities are relatively low. However, synthetic sapphire and multispectral zinc sulphide have the advantage of being transmissive to UV light. Thus, if the sleeve 30 is separately formed, then the base 24 and the cover 26 may each be formed from either silicon or tungsten. Alternatively, one may be formed from silicon, while the other is formed from tungsten. If the sleeve 30 is to be UV cured in the base 24 with the cover 26 attached, then typically the cover 26 may be formed from either synthetic sapphire or multispectral zinc sulphide. When the cover 26 is formed from either synthetic sapphire or multispectral zinc sulphide, the base 24 may be formed from silicon or tungsten. An exemplary material from which the base 24 is formed may have a thermal conductivity greater than 50 W/m° K and a CTE less than $5 \times 10^{-6}$/° K. An exemplary material from which the cover 26 is formed may have a thermal conductivity greater than 20 W/m° K and a CTE less than $7 \times 10^{-6}$/° K.

The housing 12 may provide, among other features, transfer or removal of heat from the submount 14. Generally, heat may transfer from the submount 14 to the housing 12 through the interface of the lower surface of the base 24 and the body 16 when the submount 14 is positioned within the cavity 20 of the housing 12. The body 16 may be formed from materials with high thermal conductivity. The body 16 may have similar constraints to those of the base 24. For reasons similar to those discussed above, an exemplary material for forming the body 16 may include tungsten. An exemplary material from which the body 16 is formed may have a thermal conductivity greater than 50 W/m° K and a CTE less than $5 \times 10^{-6}$/° K.

The heat-dissipation package 10, that is constructed with the sleeve 30 having the dimensions discussed and with all of the components being formed from the materials discussed, may have a thermal slope of 0.005 degrees Celsius per Watt (° C./W), wherein the thermal slope of an object is the amount of temperature increase of the object for the amount of power applied to it. The thermal slope applies to the temperature increase per watt of pump power in the cladding 204 as well as to the temperature increase per watt of signal power in the fiber core 202. The thermal slope of the heat-dissipation package 10 of the current invention allows for multiple kilowatts of power to be applied while maintaining a temperature of the components of the package 10 and the optical fiber 200 that is within acceptable parameters.

It is generally desired to limit the temperature of the coatings of the optical fiber 200 in order to maintain structural integrity of the coating. For example, the temperature of a fluoroacrylate coating should be kept at less than or equal to approximately 70° C. This temperature constraint also applies to the sleeve 30 of the heat-dissipation package 10, since the sleeve 30 encapsulates the cladding 204 in the same fashion as the coatings. In an exemplary optical fiber laser system 100, a pump power of 5 kilowatts (kW) and a signal power of 5 kW may be applied, resulting in a temperature increase of 50° C. (0.005° C./W×10 kW). This leads to the sleeve 30 having a temperature of 70° C., assuming that the temperature of the base 24 is 20° C. In contrast, a high reflector optical fiber 104 with two coating layers as illustrated in FIG. 8, that would normally be utilized in an optical fiber laser system 100 may have a thermal slope of 0.05° C./W. Therefore, the high reflector optical fiber 104, without the heat-dissipation package 10 of the current invention, would be able to handle only 10% of the applied power before the temperature of the coatings exceeds the safe operating temperature of 70° C. Furthermore, the heat-dissipation package 10 of the current invention may minimize hot spots created by contaminants at the surface of the optical fiber 200 which generate temperature gradients along the FBG 212 that will spoil its spectral response.

In addition, when the components of the submount 14 and the housing 12 are formed from materials with the ranges of values of CTEs that are discussed above, the optical fiber 200 that is retained in the heat-dissipation package 10 is better able to withstand the thermal stresses which occur when a large pump power and a large signal power are applied. Also, since the optical fiber 200 is attached to the housing 12 at two axially spaced apart points, there is a slight tension on the fiber 200 that is less likely to vary when the materials constituting the package 10 have CTEs that are more closely matched to that of the optical fiber 200. Therefore, the heat-dissipation package 10 of the current invention may offer greater structural reliability and improved spectral response.

The heat-dissipation package 10 may also be utilized with the packaging of two optical fibers 200A, 200B of the type illustrated in FIG. 8 that are to be spliced to one another, which creates an optical fiber assembly 300, as shown in FIGS. 11-13. As an example, one end of each optical fiber 200A, 200B may be stripped of its coating layers leaving a stripped section with just the cladding 204 and the core 202. The ends of the optical fibers 200A and 200B may be fused together, creating a single optical fiber 200 which includes a fiber splice 302 and has a length that is just cladding 204 and core 202. Without using the heat-dissipation package 10, the cladding 204 and core 202 could be recoated with one or more layers, and the optical fiber 200 could be utilized in a normal fashion. However, the stripping and recoating procedure may leave contaminants at the surface of the optical fibers 200A and 200B, which absorb optical power propagating in the cladding 204 and generate heat. As a result, performance of the spliced optical fiber 200 would suffer. To avoid this situation, the spliced cladding 204 and core 202 may be encapsulated by the sleeve 30, and the rest of the optical fiber 200 may be positioned in the heat-dissipation package 10 as described above. The heat-dissipation package 10 may remove the heat generated at the splice while preserving the transmission of optical power through the optical fiber 200.

Figure 2:
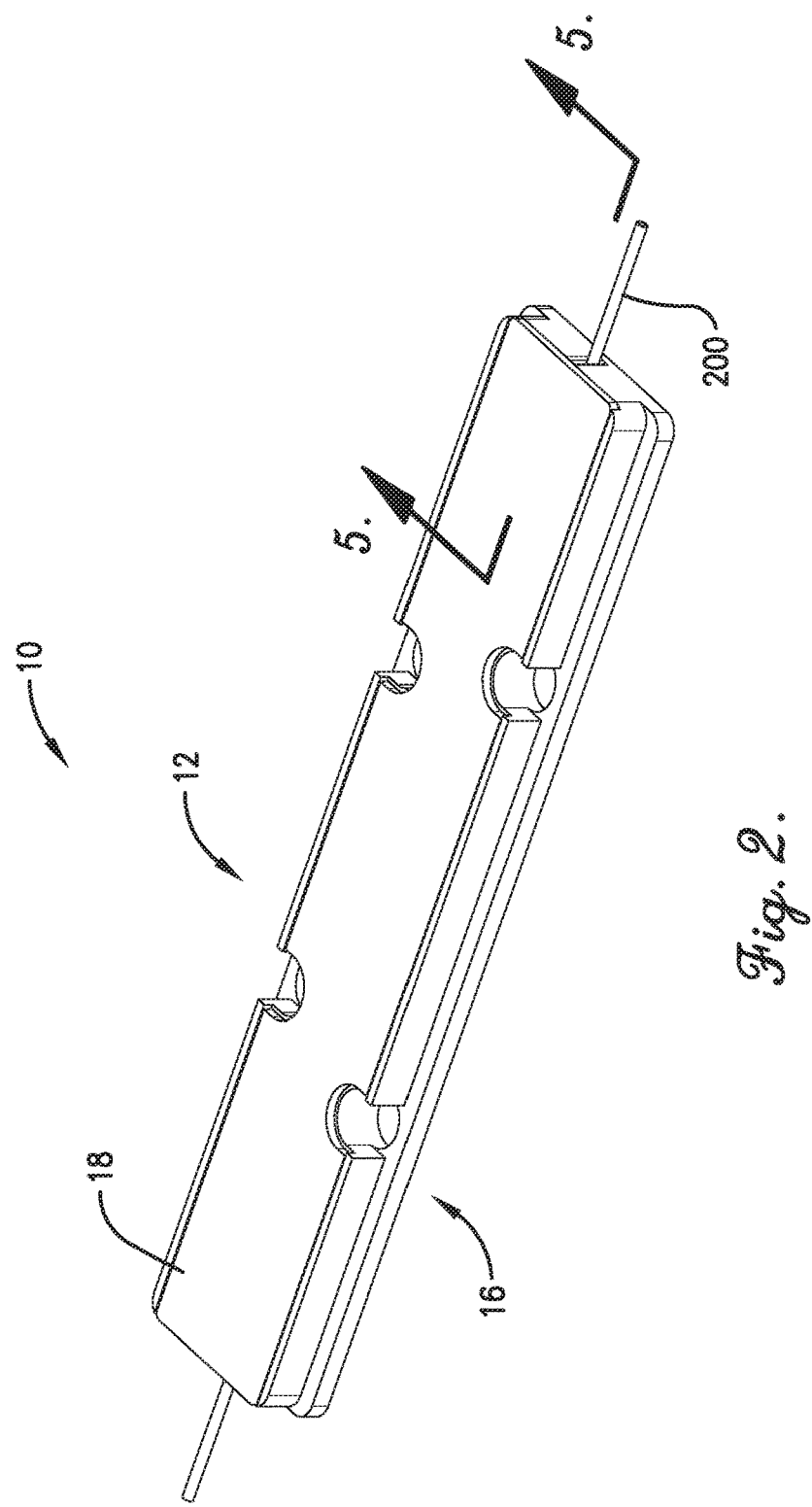
FIG. 2 is a perspective view of a heat-dissipation package, constructed in accordance with various embodiments of the current invention, for use with an optical fiber.

In another embodiment of the current invention, the heat-dissipation package 10 may be combined with the optical fiber 200 including the FBG 212 to create the high reflector optical fiber 104 or the output coupler optical fiber 108. The high reflector optical fiber 104 or the output coupler optical fiber 108 may be constructed as shown in FIG. 2, wherein at least one end of the optical fiber 200 may be spliced to the gain optical fiber 106 to form the optical resonator portion of the optical fiber laser system 100.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A heat-dissipation package for use with an optical fiber with a heat-generating section, the optical fiber including a core which is surrounded by at least one cladding which is surrounded by at least one coating layer, the heat-generating section including the core and the at least one cladding and occupying a portion of an axial length of the optical fiber, the heat-dissipation package comprising:
 a base including an upper surface, a lower surface, two opposing end surfaces, and a groove embedded in the upper surface, the groove having a generally U-shaped cross-sectional shape;
 a cover including an upper surface, a lower surface, and two opposing end surfaces, the cover positioned on the upper surface of the base; and
 a hollow sleeve including a cylindrical inner surface and an outer surface with a first portion which has a generally U-shaped cross section and a second portion which has a generally planar cross section such that edges of the planar cross section contact an open end of the U-shaped cross section, the first portion of the outer surface of the sleeve positioned in the groove and the second portion of the outer surface of the sleeve in contact with the cover, the sleeve formed from a material that has a thermal resistance less than $1.5 \times 10^{-4}$ degree Kelvin meter$^2$ per Watt between the inner surface and outer surface, the sleeve configured to encapsulate the heat-generating section of the optical fiber.

2. The heat-dissipation package of claim 1, further comprising two fiber support blocks, each fiber support block of generally rectangular box shape and each including a through hole with a first section having a first diameter and a second section having a second diameter, the first diameter being less than the second diameter, each fiber support block configured to receive a portion of the optical fiber in the through hole such that the first section receives the core and the at least one cladding and the second section receives the core, the at least one cladding, and the at least one coating layer.

3. The heat-dissipation package of claim 2, wherein the base further includes two pedestals, each pedestal extending outward longitudinally from one end surface adjacent to the lower surface, the cover further includes two overhangs, each overhang extending outward longitudinally from one end surface adjacent to the upper surface, and each fiber support block is positioned in the space between one pedestal and one corresponding overhang.

4. The heat-dissipation package of claim 2, wherein the fiber support blocks are formed of a material with an index of refraction smaller than the index of refraction of the at least one cladding.

5. The heat-dissipation package of claim 2, wherein the fiber support blocks are formed from a fluoroacrylate polymer.

6. The heat-dissipating package of claim 1, wherein the sleeve is formed of a material with an index of refraction smaller than the index of refraction of the at least one cladding.

7. The heat-dissipation package of claim 1, wherein the sleeve is formed from a fluoroacrylate polymer and has a thickness ranging from approximately 5 microns to approximately 30 microns.

8. The heat-dissipation package of claim 1, wherein the sleeve has an axial length that is approximately the same as an axial length of the heat-generating section of the optical fiber.

9. The heat-dissipation package of claim 1, wherein the cover and the base are each formed from silicon or tungsten.

10. The heat-dissipation package of claim 1, wherein the cover is formed from a material that is transmissive to ultraviolet wavelength radiation.

11. The heat-dissipation package of claim 1, wherein the cover is formed from multispectral zinc sulphide or synthetic sapphire.

12. The heat-dissipation package of claim 1, wherein the base is formed from a material that has a thermal conductivity greater than 50 Watts per meter degree Kelvin and a coefficient of thermal expansion less than $5 \times 10^{-6}$ per degree Kelvin.

13. The heat-dissipation package of claim 1, wherein the cover is formed from a material that has a thermal conductivity greater than 20 Watts per meter degree Kelvin and a coefficient of thermal expansion less than $7 \times 10^{-6}$ per degree Kelvin.

14. The heat-dissipation package of claim 1, further comprising a housing including a body and a lid, the body including a central cavity retaining the base and the cover and opposing ends, each end having a channel configured to receive a portion of the optical fiber.

15. The heat-dissipation package of claim 14, wherein the body is formed from a material that has a thermal conductivity greater than 50 Watts per meter degree Kelvin and a coefficient of thermal expansion less than $5 \times 10^{-6}$ per degree Kelvin.

16. The heat-dissipation package of claim 14, wherein the body is formed from tungsten.

17. A heat-dissipation package for use with an optical fiber with a heat-generating section, the optical fiber including a core which is surrounded by at least one cladding which is surrounded by at least one coating layer, the heat-generating section including the core and the at least one cladding and occupying a portion of an axial length of the optical fiber, the heat-dissipation package comprising:
 a housing including a body and a lid, the body including a central cavity and opposing ends, each end having a channel configured to receive a portion of the optical fiber; and
 a submount positioned in the central cavity, the submount including
  a base including an upper surface, a lower surface, two opposing end surfaces, and a groove embedded in the upper surface, the groove having a generally U-shaped cross-sectional shape, each end surface including a pedestal extending longitudinally therefrom,
  a cover including an upper surface, a lower surface, and two opposing end surfaces, the cover positioned on the upper surface of the base, each end surface including an overhang extending longitudinally therefrom,
  two fiber support blocks, one fiber support block positioned in each of the spaces created between one overhang and one corresponding pedestal, each fiber support block including a through hole and configured to receive a portion of the optical fiber in the through hole, and
  a hollow sleeve including a cylindrical inner surface and an outer surface with a first portion which has a generally U-shaped cross section and a second portion which has a generally planar cross section such that edges of the planar cross section contact an open end of the U-shaped cross section, the first portion of the outer surface of the sleeve positioned in the groove and the second portion of the outer surface of the sleeve in contact with the cover, the sleeve configured to encapsulate the heat-generating section of the optical fiber.

18. The heat-dissipation package of claim 17, wherein the fiber support blocks are formed of a material with an index of refraction smaller than the index of refraction of the at least one cladding.

19. The heat-dissipation package of claim 17, wherein the fiber support blocks are formed from a fluoroacrylate polymer.

20. The heat-dissipation package of claim 17, wherein the sleeve is formed from a material that has a thermal resistance less than $1.5 \times 10^{-4}$ degree Kelvin meter 2 per Watt between the inner surface and outer surface.

21. The heat-dissipating package of claim 17, wherein the sleeve is formed from a material with an index of refraction smaller than the index of refraction of the at least one cladding.

22. The heat-dissipation package of claim 17, wherein the sleeve is formed from a fluoroacrylate polymer and has a thickness ranging from approximately 5 microns to approximately 30 microns.

23. The heat-dissipation package of claim 17, wherein the sleeve has an axial length that is approximately the same as an axial length of the heat-generating section of the optical fiber.

24. The heat-dissipation package of claim 17, wherein the cover and the base are each formed from silicon or tungsten.

25. The heat-dissipation package of claim 17, wherein the cover is formed from a material that is transmissive to ultraviolet wavelength radiation.

26. The heat-dissipation package of claim 18, wherein the cover is formed from multispectral zinc sulphide or synthetic sapphire.

27. The heat-dissipation package of claim 18, wherein the base is formed from a material that has a thermal conductivity greater than 50 Watts per meter degree Kelvin and a coefficient of thermal expansion less than $5 \times 10^{-6}$ per degree Kelvin.

28. The heat-dissipation package of claim 17, wherein the cover is formed from a material that has a thermal conductivity greater than 20 Watts per meter degree Kelvin and a coefficient of thermal expansion less than $7 \times 10^{-6}$ per degree Kelvin.

29. The heat-dissipation package of claim 17, wherein the body is formed from a material that has a thermal conductivity greater than 50 Watts per meter degree Kelvin and a coefficient of thermal expansion less than $5 \times 10^{-6}$ per degree Kelvin.

30. The heat-dissipation package of claim 17, wherein the body is formed from tungsten.

31. A heat-dissipation package for use with an optical fiber with a heat-generating section, the optical fiber including a core which is surrounded by at least one cladding which is surrounded by at least one coating layer, the heat-generating section including the core and the at least one cladding and occupying a portion of an axial length of the optical fiber, the heat-dissipation package comprising:
- a base including an upper surface, a lower surface, two opposing end surfaces, and a groove embedded in the upper surface, the groove having a generally U-shaped cross-sectional shape;
- a cover including an upper surface, a lower surface, and two opposing end surfaces, the cover positioned on the upper surface of the base;
- a hollow sleeve including a cylindrical inner surface and an outer surface with a first portion which has a generally U-shaped cross section and a second portion which has a generally planar cross section such that edges of the planar cross section contact an open end of the U-shaped cross section, the first portion of the outer surface of the sleeve positioned in the groove and the second portion of the outer surface of the sleeve in contact with the cover, the sleeve configured to encapsulate the heat-generating section of the optical fiber; and
- two fiber support blocks, each fiber support block of generally rectangular box shape and each including a through hole with a first section having a first diameter and a second section having a second diameter, the first diameter being less than the second diameter, each fiber support block configured to receive a portion of the optical fiber in the through hole such that the first section receives the core and the at least one cladding and the second section receives the core, the at least one cladding, and the at least one coating layer.

32. The heat-dissipation package of claim 31, wherein the base further includes two pedestals, each pedestal extending outward longitudinally from one end surface adjacent to the lower surface, the cover further includes two overhangs, each overhang extending outward longitudinally from one end surface adjacent to the upper surface, and each fiber support block is positioned in the space between one pedestal and one corresponding overhang.

33. The heat-dissipation package of claim 31, wherein the fiber support blocks are formed of a material with an index of refraction smaller than the index of refraction of the at least one cladding.

34. The heat-dissipation package of claim 31, wherein the fiber support blocks are formed from a fluoroacrylate polymer.

35. A heat-dissipation package for use with an optical fiber with a heat-generating section, the optical fiber including a core which is surrounded by at least one cladding which is surrounded by at least one coating layer, the heat-generating section including the core and the at least one cladding and occupying a portion of an axial length of the optical fiber, the heat-dissipation package comprising:
- a base formed from a material that has a thermal conductivity greater than 50 Watts per meter degree Kelvin and a coefficient of thermal expansion less than $5 \times 10^{-6}$ per degree Kelvin, the base including an upper surface, a lower surface, two opposing end surfaces, and a groove embedded in the upper surface, the groove having a generally U-shaped cross-sectional shape;
- a cover including an upper surface, a lower surface, and two opposing end surfaces, the cover positioned on the upper surface of the base; and
- a hollow sleeve including a cylindrical inner surface and an outer surface with a first portion which has a generally U-shaped cross section and a second portion which has a generally planar cross section such that edges of the planar cross section contact an open end of the U-shaped cross section, the first portion of the outer surface of the sleeve positioned in the groove and the second portion of the outer surface of the sleeve in contact with the cover, the sleeve configured to encapsulate the heat-generating section of the optical fiber.

36. A heat-dissipation package for use with an optical fiber with a heat-generating section, the optical fiber including a core which is surrounded by at least one cladding which is surrounded by at least one coating layer, the heat-generating section including the core and the at least one cladding and occupying a portion of an axial length of the optical fiber, the heat-dissipation package comprising:
- a base including an upper surface, a lower surface, two opposing end surfaces, and a groove embedded in the upper surface, the groove having a generally U-shaped cross-sectional shape;
- a cover formed from a material that has a thermal conductivity greater than 20 Watts per meter degree Kelvin and a coefficient of thermal expansion less than $7 \times 10^{-6}$ per degree Kelvin, the cover including an upper surface, a lower surface, and two opposing end surfaces, the cover positioned on the upper surface of the base; and
- a hollow sleeve including a cylindrical inner surface and an outer surface with a first portion which has a generally U-shaped cross section and a second portion which has a generally planar cross section such that edges of the planar cross section contact an open end of the U-shaped cross section, the first portion of the outer surface of the sleeve positioned in the groove and the second portion of the outer surface of the sleeve in contact with the cover, the sleeve configured to encapsulate the heat-generating section of the optical fiber.

37. A heat-dissipation package for use with an optical fiber with a heat-generating section, the optical fiber including a core which is surrounded by at least one cladding which is surrounded by at least one coating layer, the heat-generating section including the core and the at least one cladding and occupying a portion of an axial length of the optical fiber, the heat-dissipation package comprising:
- a base including an upper surface, a lower surface, two opposing end surfaces, and a groove embedded in the upper surface, the groove having a generally U-shaped cross-sectional shape;
- a cover including an upper surface, a lower surface, and two opposing end surfaces, the cover positioned on the upper surface of the base;
- a hollow sleeve including a cylindrical inner surface and an outer surface with a first portion which has a generally U-shaped cross section and a second portion which has a generally planar cross section such that edges of the planar cross section contact an open end of the U-shaped cross section, the first portion of the outer surface of the sleeve positioned in the groove and the second portion of the outer surface of the sleeve in contact with the cover, the sleeve configured to encapsulate the heat-generating section of the optical fiber; and a housing including a body and a lid, the body including a central cavity retaining the base and the cover and opposing ends, each end having a channel configured to receive a portion of the optical fiber, wherein the body is formed from a material that has a thermal conductivity greater than 50 Watts per meter degree Kelvin and a coefficient of thermal expansion less than $5 \times 10^{-6}$ per degree Kelvin.

* * * * *